US009361654B2

(12) United States Patent
Altaf et al.

(10) Patent No.: US 9,361,654 B2
(45) Date of Patent: Jun. 7, 2016

(54) MANAGING PAST ACTIVITIES BASED ON RELATIONSHIP CHANGES IN A SOCIAL NETWORK

(71) Applicant: International Business Machines Corporation, Armonk, NY (US)

(72) Inventors: Faheem Altaf, Pflugerville, TX (US);
Steven D. Clay, Pflugerville, TX (US);
William A. Griffith, Austin, TX (US);
Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 13/922,723

(22) Filed: Jun. 20, 2013

(65) Prior Publication Data

US 2014/0379796 A1    Dec. 25, 2014

(51) Int. Cl.
*G06F 15/16* (2006.01)
*G06Q 50/00* (2012.01)
*H04L 29/06* (2006.01)

(52) U.S. Cl.
CPC ............... *G06Q 50/01* (2013.01); *H04L 63/10* (2013.01); *H04L 63/102* (2013.01); *H04L 63/0407* (2013.01)

(58) Field of Classification Search
CPC .................................................. G06Q 50/01
USPC ........................................................ 709/204
See application file for complete search history.

(56) References Cited

U.S. PATENT DOCUMENTS

| 2007/0192299 A1* | 8/2007 | Zuckerberg | G06Q 10/10 |
| 2009/0070334 A1* | 3/2009 | Callahan | G06F 21/604 |
| 2010/0235886 A1 | 9/2010 | Muller et al. | |
| 2011/0167059 A1 | 7/2011 | Fallah | |
| 2012/0150960 A1* | 6/2012 | Nalawade | G06Q 30/02 709/204 |
| 2012/0188940 A1* | 7/2012 | Agrawal | H04W 4/185 370/328 |
| 2013/0133054 A1* | 5/2013 | Davis | G06F 21/316 726/7 |
| 2013/0246521 A1* | 9/2013 | Schacht | G06Q 50/01 709/204 |
| 2013/0326578 A1* | 12/2013 | Blom | G06F 21/6218 726/1 |
| 2014/0096200 A1* | 4/2014 | Brown | G06F 21/6263 726/4 |
| 2014/0257998 A1* | 9/2014 | Jimison | G06Q 30/0277 705/14.69 |
| 2014/0317184 A1* | 10/2014 | Weaver | H04L 67/22 709/204 |
| 2016/0034716 A1* | 2/2016 | Virochsiri | G06F 17/30864 726/28 |

OTHER PUBLICATIONS

Winters, Kelly. "Improving the Experience When Relationships End". Nov. 19, 2015. pp. 1-6.*
http://personalweb.about.com/od/facebookprivacysettings/a/facebook_wall_privacy.htm, "Facebook Wall Privacy Settings", printed May 13, 2013.
http://www.allfacebook.com/facebook-privacy-new_b9075, "10 New Privacy Settings Every Facebook User Should Know", printed May 13, 2013.

* cited by examiner

*Primary Examiner* — Imad Hussain
(74) *Attorney, Agent, or Firm* — Scully, Scott, Murphy & Presser, P.C.; Daniel Simek

(57) ABSTRACT

Various embodiments provide for dynamically and automatically managing activities of two parties (e.g., friends, business associates, family members) based on a change in relationship (e.g., no longer friends, break-up, divorce, no longer working together) between the two parties in a network (e.g., a social network implemented using a social networking website). In one specific example, mechanisms are provided for dynamically and automatically adjusting privacy control (e.g. removing, hiding, scraping, deleting, obscuring) of past activity data (e.g. social network wall posts, social network wall re-posts, pictures, forum posts, blog posts, blog comments, documents, files, videos, tags etc.) of the two parties upon detecting a change in relationship between the two parties in the social network.

20 Claims, 3 Drawing Sheets

MANAGING PAST ACTIVITIES BASED ON RELATIONSHIP CHANGES IN A SOCIAL NETWORK

BACKGROUND

The present disclosure relates generally to the field of managing one or more past activities (e.g., social activities) based on one or more relationship changes in a social network.

Social relationships change all of the time. Today, two people might be friends living in the same part of the town or working for the same company. Tomorrow these people may move to a different location or change jobs. These changes can make it hard to stay in touch. Also, along the way, if these relationships change (e.g., not friends any more, breakups, divorce, bullying) people may decide not to stay in touch moving forward.

Additionally, people are more and more living their daily lives via social networks—where they have defined their relationships (e.g. engaged, married, divorced, business partners). Once people are in a relationship, they typically share their activities (e.g. via social network wall posts, via exchanging pictures, via tagging pictures, via posts on forums, via comments.). Some of these activities (and the artifacts that they create) are of a personal nature and may be kept private or shared with a limited group.

Conventionally, if two people's relationship changes, their activities (as evidenced, for example, by artifacts such as pictures, social network wall posts, etc.) will remain on the social network for others to view. In this regard, others may or may not know that the two people originally in the relationship are no longer friends, not engaged, not married, etc. This can cause problems moving forward for the two people originally in the relationship.

SUMMARY

In various embodiments, methodologies may be provided that automatically manage one or more past activities (e.g., social activities) based on one or more relationship changes in a social network.

In one embodiment, a method for adjusting access to at least one social network artifact based on a change in a relationship between a first social network contact and a second social network contact is provided, the method comprising: tracking with a processor at least one social interaction between the first social network contact and the second social networking contact; determining with the processor, based upon the tracking, that the relationship between the first social network contact and the second social network contact has changed; and adjusting with the processor, based upon the determination that the relationship between the first social network contact and the second social network contact has changed, at least one privacy rule for the social network artifact.

In another embodiment, a computer readable storage medium, tangibly embodying a program of instructions executable by the computer for adjusting access to at least one social network artifact based on a change in a relationship between a first social network contact and a second social network contact is provided, the program of instructions, when executing, performing the following steps: tracking at least one social interaction between the first social network contact and the second social networking contact; determining, based upon the tracking, that the relationship between the first social network contact and the second social network contact has changed; and adjusting, based upon the determination that the relationship between the first social network contact and the second social network contact has changed, at least one privacy rule for the social network artifact.

In another embodiment, a computer-implemented system for adjusting access to at least one social network artifact based on a change in a relationship between a first social network contact and a second social network contact is provided, the system comprising: a tracking element configured to track at least one social interaction between the first social network contact and the second social networking contact; a determining element configured to determine, based upon the tracking, that the relationship between the first social network contact and the second social network contact has changed; and an adjusting element configured to adjust, based upon the determination that the relationship between the first social network contact and the second social network contact has changed, at least one privacy rule for the social network artifact.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

Figure 1:
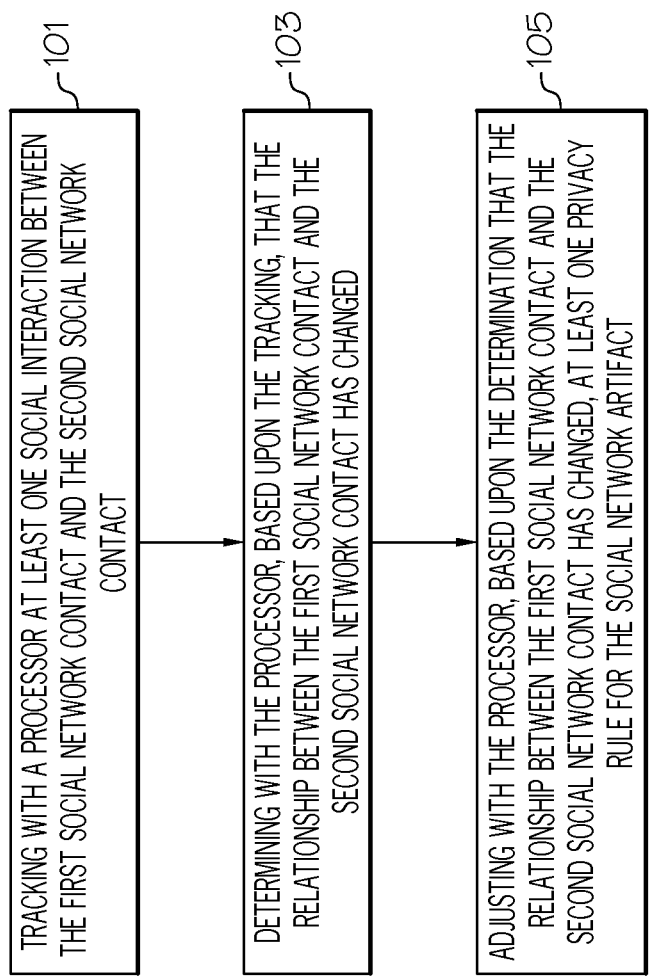
FIG. 1 depicts a flowchart of a method according to an embodiment of the present invention.

As described herein, various systems provide for managing one or more past activities (e.g., social activities) based on one or more relationship changes in a social network. Further, as described herein, various methods provide for managing one or more past activities (e.g., social activities) based on one or more relationship changes in a social network. Further still, as described herein, various algorithms provide for managing one or more past activities (e.g., social activities) based on one or more relationship changes in a social network. Such managing, in one embodiment, may include adjusting access to at least one social network artifact based on a change in a relationship between a first social network contact and a second social network contact.

For the purposes of describing and claiming the present invention the term "social network" is intended to refer to a grouping of people according to one or more relationships between and/or among them. In one example, a social network may include a plurality of members and may be organized and maintained via a computer system.

For the purposes of describing and claiming the present invention the term "social network contacts" is intended to refer to two or more people in a social network who are (or have been) related in some manner. In various examples, such relationships may be (or may have been) as family, as friends, as work colleagues, as associates, as "a friend of a friend", as graduates of the same school and/or any other desired feature or characteristic.

For the purposes of describing and claiming the present invention the term "social network artifact" is intended to refer to any manifestation of an existing or previous relationship between two or more social network contacts. In various examples, such social network artifacts may be: (a) one or more social network wall posts; (b) one or more social network wall re-posts; (c) one or more pictures; (d) one or more forum posts; (e) one or more blog posts; (f) one or more blog comments; (g) one or more documents; (h) one or more files; (i) one or more videos; (j) one or more tags; and (k) any combination thereof.

For the purposes of describing and claiming the present invention the term "status change" is intended to refer to any indication of a relationship change that is manifested in connection with a social network. In one example, a status change may be manifested by information presented on a profile page.

In one embodiment, an example implementation scenario is as follows: users A and B are friends. A has a social network access group "A's friends." A unfriends B—now B is not in the access group "A's friends" and cannot see any posts to this group.

In one example related to the above scenario, users A and B have the power to decide if past content (e.g., a picture) is removed (e.g., via hiding, scraping, deleting, obscuring, anonymizing) restricted, archived, or left untouched on the profiles and/or associated web pages of A and/or B after the unfriend event happens (in one specific example, after the unfriend event happens A may decide the disposition of the past content on the profiles and/or associated web pages of B; in another specific example, after the unfriend event happens B may decide the disposition of the past content on the profiles and/or associated web pages of A).

In another example related to the above scenario, users A and B can mark any content (e.g., a picture) on a 3rd party's profile and/or associated web pages as private if such content evidences the relationship (now unfriended) between A and B.

Referring now to FIG. 1, a method for adjusting access to at least one social network artifact based on a change in a relationship between a first social network contact and a second social network contact is shown. As seen in this FIG. 1, the method of this embodiment comprises: at 101—tracking with a processor at least one social interaction between the first social network contact and the second social networking contact; at 103—determining with the processor, based upon the tracking, that the relationship between the first social network contact and the second social network contact has changed; and at 105—adjusting with the processor, based upon the determination that the relationship between the first social network contact and the second social network contact has changed, at least one privacy rule for the social network artifact.

In one example, any steps may be carried out in the order recited or the steps may be carried out in another order.

In another example, the determining that the relationship between the first social network contact and the second social network contact has changed may be performed via data analysis, natural language processing and/or meta data associated with the social network contacts.

Other examples of how to perform the step of determining that the relationship between the first social network contact and the second social network contact has changed may include (but not be limited to): (a) a person has explicitly chosen to sever a relationship through a programmatic interface (such an interface may be used to receive/obtain any information of the type described herein); (b) a person has moved as indicated on their profile (this may apply, for example, in the case that a friendship was based on geography—like next door neighbor, etc.); (c) one or more people have left a group they shared in common as indicated in their profile (this may apply, for example, in the case of a club, employment, etc.); and/or (d) organization change (for instance, a person is transferred out of a department—thereafter he/she shouldn't have access to the department forum (including, e.g., no access to any previous posts)).

In another example, the adjusting at least one privacy rule for the social network artifact may be performed by modifying data in a database.

Other examples of how to perform the step of adjusting at least one privacy rule for the social network artifact may include (but not be limited to): (a) updating a database table that reflects the rights of users; (b) changing configuration files that contain the rights of users; and/or (c) using grouping techniques—such as removing the unfriended person(s) from a common group that reflected their relationship.

In another example, adjusting privacy rules may utilize logic (e.g., proprietary logic) in one or more a social network websites.

In another example, privacy rule(s) for the social network artifact(s) may be stored in one or more databases (e.g. one or more databases of one or more social network providers).

One specific example of a form of the privacy rule(s) and who maintains the privacy rule(s) may be as follows: User A only allows those people that user A has marked as "family" to see pictures of user A's children on user A's page. This may be a rule that user A defines on the website himself, using the tools provided by the wesbite. User A may further allow "friends" to see pictures of user A and his wife, but no pictures that have user A's children, for example. Further, those people marked by user A as "acquaintance" may not be allowed to see any pictures, other than the profile picture of user A. User a may maintain the rules as a user himself, using the tools provided by the social network website interface (which may be, for example, a proprietary interface).

In another example, the social network artifact comprises: (a) one or more social network wall posts; (b) one or more social network wall re-posts; (c) one or more pictures; (d) one or more forum posts; (e) one or more blog posts; (f) one or more blog comments; (g) one or more documents; (h) one or more files; (i) one or more videos; (j) one or more tags; (k) one or more profile pages; and (l) any combination thereof.

In another example, the social interaction comprises a status change.

In another example, the change in relationship comprises a change from a first relationship to a second relationship.

In another example, the second relationship comprises: (a) not friend; (b) broken up; (c) divorced; (d) bullied; (e) moved away more than a predetermined distance; (f) discharged from employment; (g) no longer working together; (h) married; and/or (i) business partners.

In another example, the privacy rule is adjusted to cause a limiting of access to at least one portion of the social network artifact.

In one specific example, a privacy rule may be that for a given social network artifact (e.g., a photograph belonging to User A), anyone may view the artifact. In this example, adjustment of the privacy rule may be that only certain people (e.g., people who are "family" of User A) may be permitted to view the artifact.

In another example, the privacy rule is adjusted to cause a limiting of access to a plurality of portions of the network social artifact.

In another example, the privacy rule is adjusted to cause a limiting of access to the entire social network artifact.

In another example, the limiting of access comprises: (a) deleting; (b) hiding; (c) obscuring; (d) anonymizing; and (e) any combination thereof.

In another example, the method further comprises: based upon the adjusted privacy rule, limiting access to at least one portion of the social network artifact.

In another example, the method further comprises: based upon the adjusted privacy rule, limiting access to a plurality of portions of the social network artifact.

In another example, the method further comprises: based upon the adjusted privacy rule, limiting access to the entire social network artifact.

In another example, the limiting of access comprises: (a) deleting; (b) hiding; (c) obscuring; (d) anonymizing; and (e) any combination thereof.

In another example, the adjusting comprises adjusting at least one privacy rule for a plurality of social network artifacts.

In another example, the adjusting comprises adjusting a set of privacy rules for the social network artifact.

In another example, the adjusting comprises adjusting a set of privacy rules for a plurality of social network artifacts.

Figure 2:
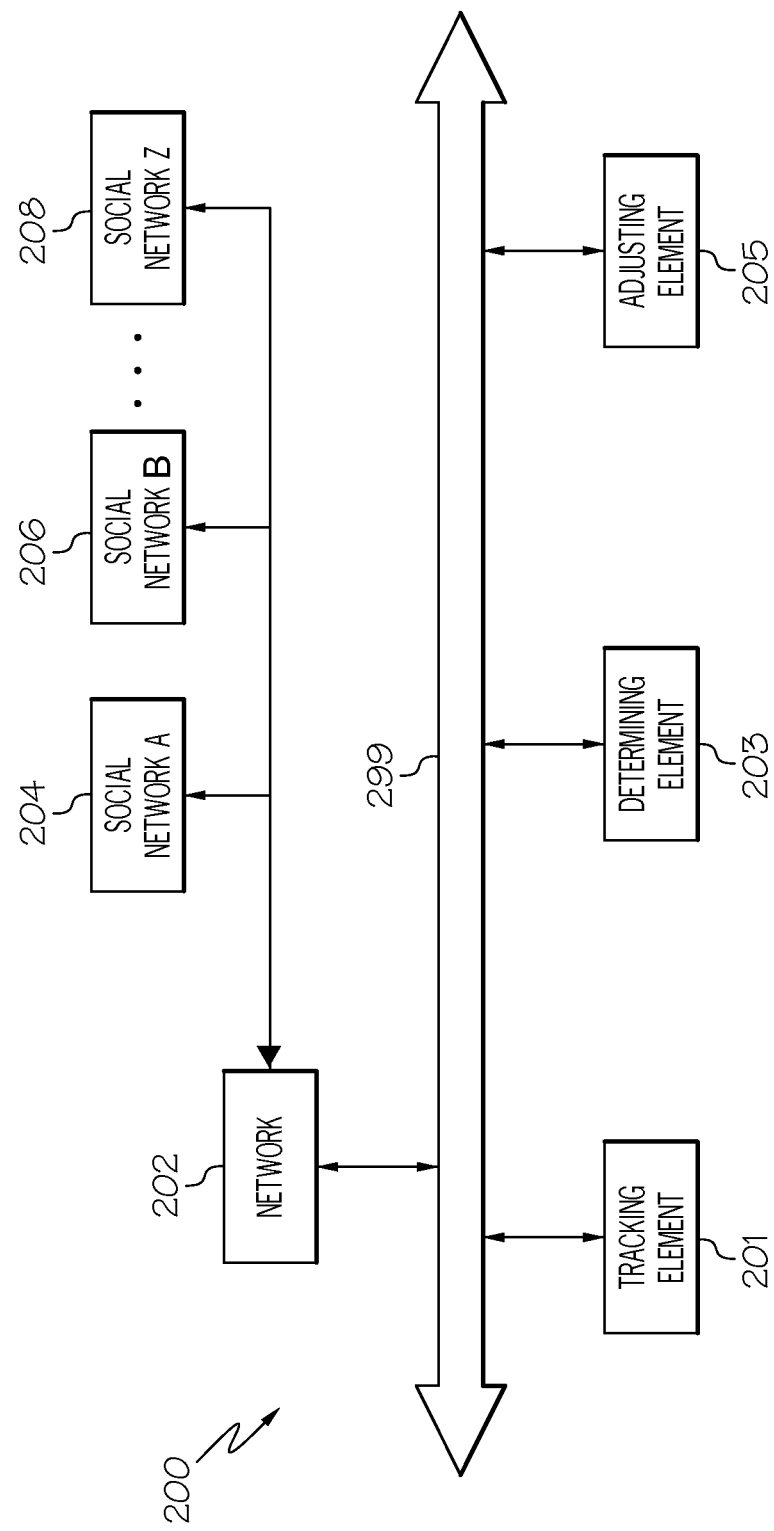
FIG. 2 depicts a block diagram of a system according to an embodiment of the present invention.

Referring now to FIG. 2, in another embodiment, a system 200 for adjusting access to at least one social network artifact based on a change in a relationship between a first social network contact and a second social network contact is provided. This system may include the following elements: a tracking element 201 configured to track at least one social interaction between the first social network contact and the second social networking contact; a determining element 203 configured to determine, based upon the tracking, that the relationship between the first social network contact and the second social network contact has changed; and an adjusting element 205 configured to adjust, based upon the determination that the relationship between the first social network contact and the second social network contact has changed, at least one privacy rule for the social network artifact.

In one example, the system 200 may interact via network 202 (e.g., the Internet) with: social network A (call out number 204), social network B (call out number 206) and/or social network Z (call out number 208). Social network A may be a social network application operated and/or maintained by a first social network provider; social network B may be a social network application operated and/or maintained by a second social network provider; and social network C may be a social network application operated and/or maintained by a third social network provider (each of the first, second and third social network providers may be distinct from one another). Of course, while three social networks are shown, various embodiments may operate in connection with any desired number of social networks. In various examples, the interaction may comprise: adjust access to artifact(s), track social interaction(s), and/or adjust privacy rule(s).

In one example, one or more privacy rules may reside at one or more different social networks (e.g., social network A, social network B and/or social network C). Information regarding changed relationship(s) and/or adjustment of privacy rule(s) may be communicated from system 200 to one or more different social networks (e.g., social network A, social network B and/or social network C), In another example, one or more privacy rules may reside at system 200. System 200 may perform adjustment of privacy rule(s). Based upon changed relationship(s), information to enforce the adjusted privacy rule(s) (e.g., information regarding permitted access to a given social network artifact) may be communicated from system 200 to one or more different social networks (e.g., social network A, social network B and/or social network C), In another example, each of a plurality of users may be associated with the same social network website. In another example, one or more of a plurality of users may be associated with one social network website and one or more of the plurality of users may be associated with another (different) social network website.

In another example, the social network artifact comprises: (a) one or more social network wall posts; (b) one or more social network wall re-posts; (c) one or more pictures; (d) one or more forum posts; (e) one or more blog posts; (f) one or more blog comments; (g) one or more documents; (h) one or more files; (i) one or more videos; (j) one or more tags; (k) one or more profile pages; and (l) any combination thereof.

In another example, the social interaction comprises a status change.

In another example, the change in relationship comprises a change from a first relationship to a second relationship.

In another example, the second relationship comprises: (a) not friend; (b) broken up; (c) divorced; (d) bullied; (e) moved away more than a predetermined distance; (f) discharged from employment; (g) no longer working together; (h) married; and/or (i) business partners.

In another example, the privacy rule is adjusted to cause a limiting of access to at least one portion of the social network artifact.

In another example, the privacy rule is adjusted to cause a limiting of access to a plurality of portions of the network social artifact.

In another example, the privacy rule is adjusted to cause a limiting of access to the entire social network artifact.

In another example, the limiting of access comprises: (a) deleting; (b) hiding; (c) obscuring; (d) anonymizing; and (e) any combination thereof.

In another example, based upon the adjusted privacy rule, access is limited to at least one portion of the social network artifact.

In another example, based upon the adjusted privacy rule, access is limited to a plurality of portions of the social network artifact.

In another example, based upon the adjusted privacy rule, access is limited to the entire social network artifact.

In another example, limiting of access comprises: (a) deleting; (b) hiding; (c) obscuring; (d) anonymizing; and (e) any combination thereof.

In another example, the adjusting comprises adjusting at least one privacy rule for a plurality of social network artifacts.

In another example, the adjusting comprises adjusting a set of privacy rules for the social network artifact.

In another example, the adjusting comprises adjusting a set of privacy rules for a plurality of social network artifacts.

Still referring to FIG. 2, each of the elements may be operatively connected together via system bus 299. In one example, communication between and among the various elements may be bi-directional. In another example, the communication may be carried out via the Internet, an intranet, a local area network, a wide area network and/or any other desired communication channel(s). In another example, some or all of these elements may be implemented in a computer system of the type shown in FIG. 3.

Figure 3:
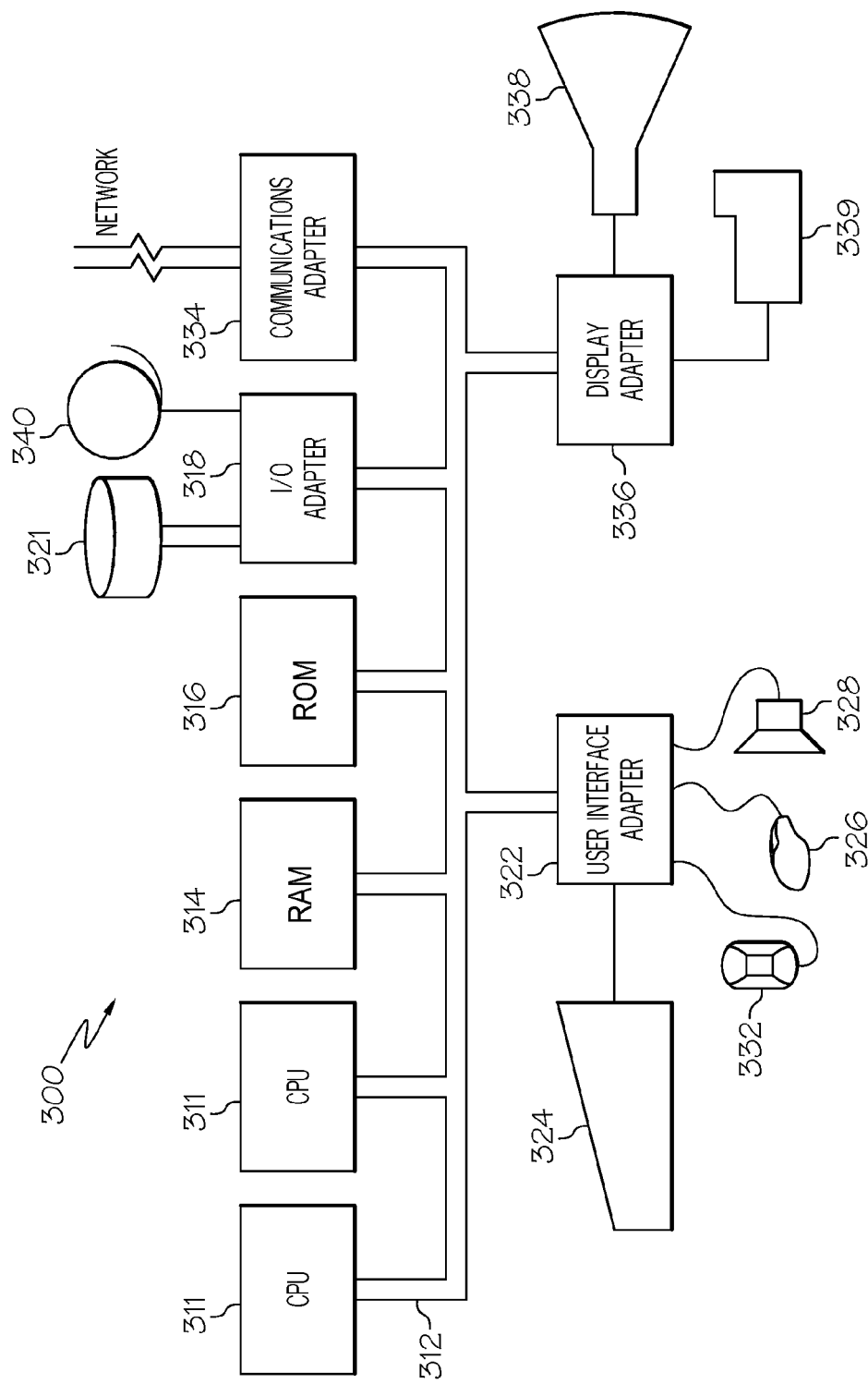
FIG. 3 depicts a block diagram of a system according to an embodiment of the present invention.

Referring now to FIG. 3, this figure shows a hardware configuration of computing system 300 according to an embodiment of the present invention. As seen, this hardware configuration has at least one processor or central processing unit (CPU) 311. The CPUs 311 are interconnected via a system bus 312 to a random access memory (RAM) 314, read-only memory (ROM) 316, input/output (I/O) adapter 318 (for connecting peripheral devices such as disk units 321 and tape drives 340 to the bus 312), user interface adapter 322

(for connecting a keyboard 324, mouse 326, speaker 328, microphone 332, and/or other user interface device to the bus 312), a communications adapter 334 for connecting the system 300 to a data processing network, the Internet, an intranet, a local area network (LAN), etc., and a display adapter 336 for connecting the bus 312 to a display device 338 and/or printer 339 (e.g., a digital printer or the like).

Of note, while various figures may show various entities communicating, it is to be understood that the figures are actually referring to communication by computer system(s) or the like that are owned, leased, operated, used by, in the possession of, and/or controlled by each of the entities.

In other examples, any steps described herein may be carried out in any appropriate desired order.

As described herein, in one embodiment it is assumed that a relationship can be severed, wherein such a severed relationship can be detected and data that evidences the prior relationship can be deleted and/or marked as private.

In one specific example, the deleted/marked as private data that evidences the relationship is owned or otherwise associated with the parties to the relationship (e.g., posts on each others' social network walls).

In another specific example, the deleted/marked as private data that evidences the relationship is data of one or more 3rd parties (e.g., a picture on a social network wall of a 3rd party, wherein the picture is of the two parties in the severed relationship).

In one specific example, there is no predetermined time that must pass after severing the relationship caused the deletion/marked as private (e.g., severing the relationship can essentially immediately remove posts, etc. that evidenced the relationship).

As described herein, mechanisms are provided for retroactively changing access to social network artifacts (after a relationship changes).

Various examples include (but are not limited to): (a) removing one or more past social network wall posts based on one or more relationship changes; (b) locking one or more past social network wall posts based on one or more relationship changes; and/or (c) hiding one more past social network wall posts based on one or more relationship changes.

In another example, the adjusting the privacy rule comprises changing a first privacy rule (or first set of privacy rules) to a second privacy rule (or second set of privacy rules).

In other examples, various embodiments may be applied in the context of social computing, collaboration and communications.

In another example, privacy rule(s) may be stored in one or more databases (e.g., which may be accessible by one or more social networks).

As described herein, various embodiments provide a mechanism to adjust access to social network artifacts (e.g., artifacts previously shared between/among two or more people) based on a relationship change, wherein the adjustment comprises automatically adjusting the access in response to a detection of the change in the relationship.

In one specific example, the adjustment to the access comprises removing (e.g., hiding, scraping, deleting, obscuring, anonymizing) portions of (or all of) the social network artifact(s).

In another example, various embodiments may be provided in the context of enterprise (business) computing (e.g., where two companies had a business relationship in the past (e.g., via conducting one or more business transactions) but no longer have such a business relationship). In one specific example, various content (e.g., collateral and/or shared and commented on by peers) may be managed as described herein.

In another example, one or more social networking systems may track the relationship between two parties (e.g., person A and person B). If any change in the relationship is detected, the social networking system(s) can dynamically do the following: (a) an unfriend option can be presented based on a system notification about relation status changes between persons A and B; (b) automatically make all activities of the two people A and B private on each other's social network walls; (c) automatically make the activities private on other people(s) social network wall(s); (d) remove all association of person A with person B with respect to any kind of activities on all social network walls (e.g., person A has posted pictures of the wedding of persons B and C in person A's gallery—in this example, wherein persons B and C become divorced, person A's gallery of these wedding pictures becomes private and the divorced parties are informed that person A has made their wedding pictures private (and that the wedding pictures can be deleted upon a request by person B and/or person C)); and/or make one or more people anonymous with respect to one or more (e.g., all) activities.

In another example, a mechanism may provide notification(s) based, for example, upon the detection of a relationship change (e.g., one or more parties may be notified of the relationship change and/or requested to take action based upon the detected relationship change).

In one specific example, a mechanism can provide content management based upon the following instructions of one or more parties: (a) hide all posts (e.g., make them private) from the social network wall of person A for person B; (b) notify all users who have posted pictures of person A and/or person B; and/or (c) remove person A's name from association with person B where they are mentioned together.

In another example, one or more actions (e.g., configurable actions) may require two or more parties to jointly (e.g., for the posts owned by both) decide what to do for all those posts.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A method for adjusting access to at least one social network artifact based on a change in a relationship between a first social network contact and a second social network contact, the method comprising:
    tracking with a processor at least one social interaction between the first social network contact and the second social networking contact;
    determining with the processor, based upon the tracking, that the relationship between the first social network contact and the second social network contact has changed; and
    adjusting, with the processor, based upon the determination that the relationship between the first social network contact and the second social network contact has changed, at least one privacy rule for the social network artifact,
    the adjusting comprising providing an option to the first social network contact and the second social network contact to mark as private content on a third social network contact's profile that evidences the relationship.

2. The method of claim 1, wherein the social network artifact comprises: (a) one or more social network wall posts; (b) one or more social network wall re-posts; (c) one or more pictures; (d) one or more forum posts; (e) one or more blog posts; (f) one or more blog comments; (g) one or more documents; (h) one or more files; (i) one or more videos; (j) one or more tags; (k) one or more profile pages; and (l) any combination thereof.

3. The method of claim 1, wherein the social interaction comprises a status change.

4. The method of claim 1, wherein the change in relationship comprises a change from a first relationship to a second relationship.

5. The method of claim 4, wherein the second relationship comprises at least one of: (a) not friend; (b) broken up; (c) divorced; (d) bullied; (e) moved away more than a predetermined distance; (f) discharged from employment; (g) no longer working together; (h) married; or (i) business partners.

6. The method of claim 1, wherein the privacy rule is adjusted to cause a limiting of access to at least one portion of the social network artifact.

7. The method of claim 6, wherein the privacy rule is adjusted to cause a limiting of access to a plurality of portions of the network social artifact.

8. The method of claim 7, wherein the privacy rule is adjusted to cause a limiting of access to the entire social network artifact.

9. The method of claim 6, wherein the limiting of access comprises: (a) deleting; (b) biding; (c) obscuring; (d) anonymizing; and (e) any combination thereof.

10. The method of claim 1, further comprising:
based upon the adjusted privacy rule, limiting access to at least one portion of the social network artifact.

11. method of claim 10, further comprising:
based upon the adjusted privacy rule, limiting access to a plurality of portions of the social network artifact.

12. The method of claim 11, further comprising:
based upon the adjusted privacy rule, limiting access to the entire social network artifact.

13. The method of claim 10, wherein the limiting of access comprises: (a) deleting; (b) hiding; (c) obscuring; (d) anonymizing; and (e) any combination thereof.

14. The method of claim 1, wherein the adjusting comprises adjusting at least one privacy rule for a plurality of social network artifacts.

15. The method of claim 1, wherein the adjusting comprises adjusting a set of privacy rules for the social network artifact.

16. The method of claim 1, wherein the adjusting comprises adjusting a set of privacy rules for a plurality of social network artifacts.

17. A computer readable storage device, tangibly embodying a program of instructions executable by the computer for adjusting access to at least one social network artifact based on a change in a relationship between a first social network contact and a second social network contact, the program of instructions, when executing, performing the following steps:

tracking at least one social interaction between the first social network contact and the second social networking contact;
determining, based upon the tracking, that the relationship between the first social network contact and the second social network contact has changed; and
adjusting, based upon the determination that the relationship between the first social network contact and the second social network contact has changed, at least one privacy rule for the social network artifact,
the adjusting comprising providing an option to the first social network contact and the second social network contact to mark as private, content on a third social network contact's profile that evidences the relationship.

18. The computer readable storage device of claim 17, wherein the social network artifact comprises: (a) one or more social network wall posts; (b) one or more social network wall re-posts; (c) one or more pictures; (d) one or more forum posts; (e) one or more blog posts; (f) one or more blog comments; (g) one or more documents; (h) one or more files; (i) one or more videos; (j) one or more tags; (k) one or more profile pages; and (l) any combination thereof.

19. A computer-implemented system for adjusting access to at least one social network artifact based on a change in a relationship between a first social network contact and a second social network contact, the system comprising:
a hardware processor operable to track at least one social interaction between the first social network contact and the second social networking contact;
the hardware processor further operable to determine, based upon the tracking, that the relationship between the first social network contact and the second social network contact has changed; and
the hardware processor further operable to adjust, based upon the determination that the relationship between the first social network contact and the second social network contact has changed, at least one privacy rule for the social network artifact,
the hardware processor providing an option to the first social network contact and the second social network contact to mark as private, content on a third social network contact's profile that evidences the relationship.

20. The system of claim 19, wherein the social network artifact comprises: (a) one or more social network wall posts; (b) one or more social network wall re-posts; (c) one or more pictures; (d) one or more forum posts; (e) one or more blog posts; (f) one or more blog comments; (g) one or more documents; (h) one or more files; (i) one or more videos; (j) one or more tags; (k) one or more profile pages; and (l) any combination thereof.

* * * * *